July 27, 1926.
G. A. ARNOLD
1,593,558
VISION PROTECTING DEVICE
Filed Feb. 8, 1923
2 Sheets-Sheet 1
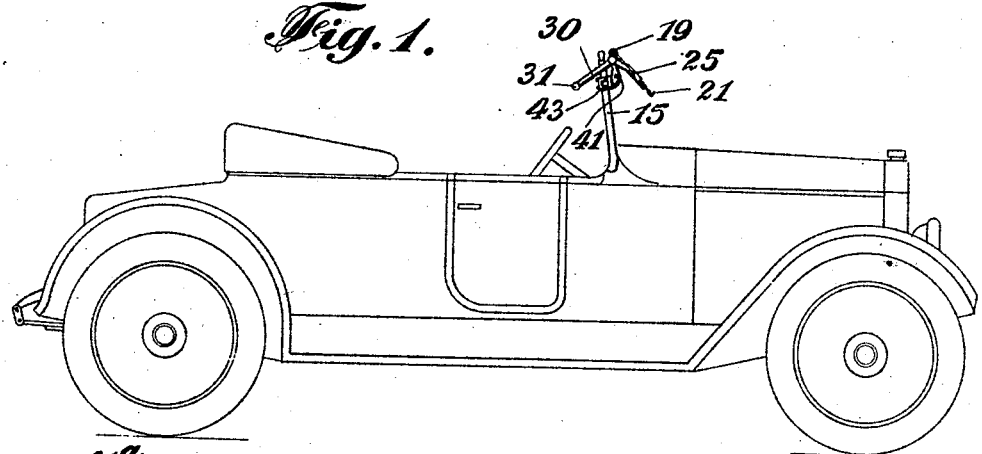
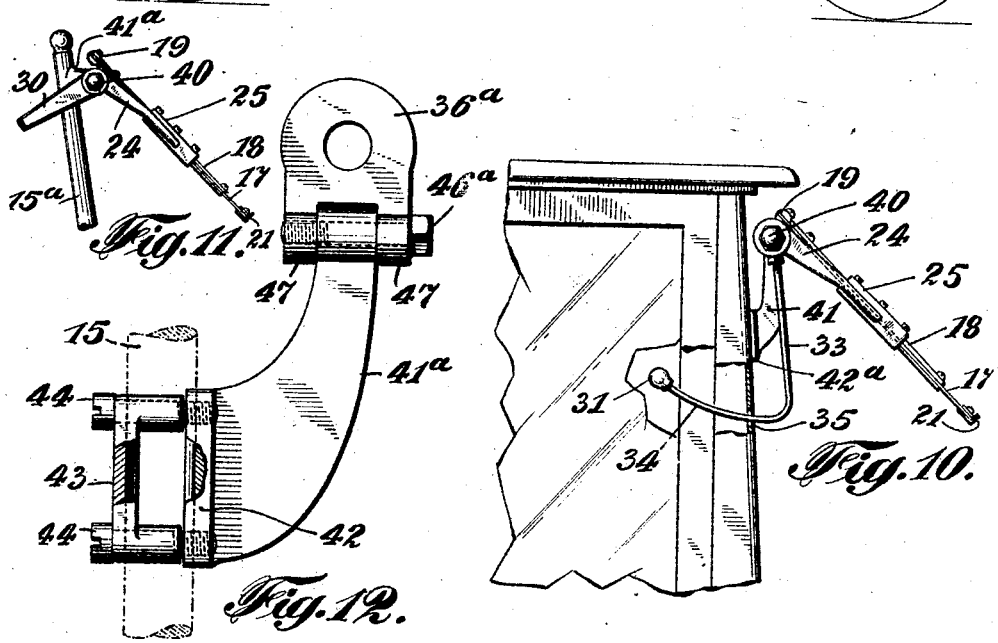
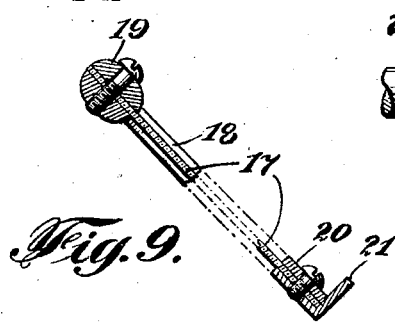
Inventor
George A. Arnold
By his Attorneys July 27, 1926.
G. A. ARNOLD
1,593,558
VISION PROTECTING DEVICE
Filed Feb. 8, 1923   2 Sheets-Sheet 2
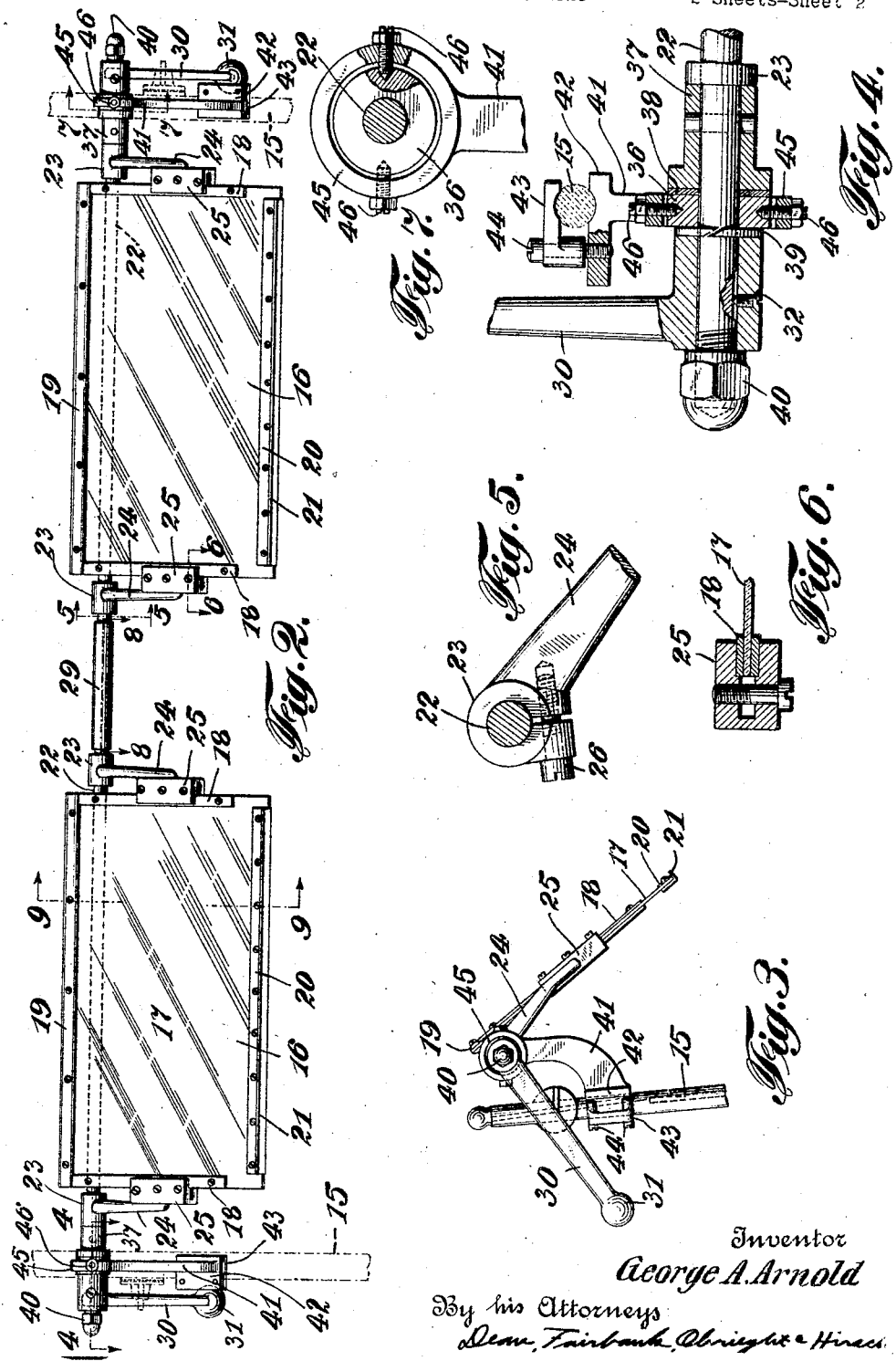
Inventor
George A. Arnold
By his Attorneys Patented July 27, 1926.

1,593,558

UNITED STATES PATENT OFFICE.

GEORGE A. ARNOLD, OF HARTFORD, CONNECTICUT, ASSIGNOR, BY MESNE ASSIGNMENTS, TO SUBURBAN TRANSIT COMPANY, OF PLAINFIELD, NEW JERSEY, A CORPORATION OF NEW JERSEY.

VISION-PROTECTING DEVICE.

Application filed February 8, 1923. Serial No. 617,664.

This invention relates to screens, shields or panels for use on vehicles, and particularly automobiles, to protect the driver or occupant from rain or wind or from the glare of the sun or headlights of other vehicles. Although certain features of the invention are useful as a part of, or in place of, the usual wind shield, other features are designed primarily for a device adapted to be used in conjunction with or in addition to the usual wind shield.

One of the main objects of my invention is to provide a shield or screen which may be easily and quickly adjusted to any angle or elevation desired by the occupant of the vehicle without necessitating his leaving his seat, and without interfering with the driving or guiding of the vehicle. Thus, the shield may be raised or lowered as occasion may require, to give protection at only those times when such protection is desirable. To accomplish this result, the shield is preferably mounted on a transverse rod mounted to oscillate in front of the wind shield, and this rod is provided with an operating handle extending to the rear side of the wind shield and in reach of the driver or other occupant.

A further object of my invention is to provide supporting means which are so adjustable that the device may be attached to wind shields or vehicle fronts of various widths and angles.

A further object is to provide separate and independently adjustable sections whereby the two occupants of the front seat of the vehicle may each adjust the section of the screen which is in front of him and independently of the adjustment of the other section.

Other objects and important features of the invention will be pointed out hereinafter, or will be apparent from a consideration of the specific constructions described.

In the accompanying drawings:—

Fig. 1 is a side elevation of a vehicle showing my improved device attached thereto.

Fig. 2 is a front elevation of the device.

Fig. 3 is an end view.

Figs. 4, 5, 6, 7, 8 and 9 are sections on the lines 4—4, 5—5, 6—6, 7—7, 8—8 and 9—9 respectively of Fig. 2, Fig. 10 is a side elevation showing a modified form particularly adaptable for closed cars, Fig. 11 is a side elevation showing a further modification, and Fig. 12 is a side elevation of a modified form of bracket.

In Figs. 1 to 9 inclusive I have illustrated a construction which is adapted to be detachably secured to the usual wind shield supporting posts or stanchions 15 and disposed in front of the usual wind shield. The body portion of the device is in the form of a panel pivotally supported about a horizontal axis and normally disposed in a downwardly and forwardly inclined position. Although in some constructions this panel may extend the full width of the wind shield and include only a single section, I have illustrated it as including two panel sections 16 arranged end to end and independently adjustable about the same axis. The panel is preferably of such material that it is transparent but will act as a dimmer to intercept the bright or glaring rays from the sun, or from the headlights of another vehicle. It is preferably of colored celluloid, xylonite or other colored transparent material which is not readily frangible. In some constructions the body portion might be formed of colored glass or even of opaque sheet material. As shown the transparent body portion 17 is held in a frame including reinforcing strips 18 along the ends, 19 along the top, and 20 along the front lower edge. Preferably one of the strips 20 along the lower edge has an upwardly extending flange 21 providing a gutter for conducting rain water to the ends of the panel.

The panel is supported upon a transversely extending rod 22 which is mounted to oscillate about its axis as hereinafter described. Various means may be employed for attaching the panel to the rod, but as illustrated the rod is provided with a pair of collars 23 having arms 24 terminating in clamps 25 which grip the ends of the frame of the panel. The collars are clamped to the rod in any suitable manner, but preferably by means which permits of the adjustment of the collars along the rod or the rotation of them in respect to the rod, but normally holds them rigid therewith. A simple form of clamping device is illustrated in Fig. 5, and includes a clamping screw 26.

Where two separate panels are employed and it is desired to independently adjust them, the rod 22 may be made of two sections connected together between the two panels by suitable means which permits of the relative rotation of the two sections. Preferably this connecting means also permits of the adjustment of the two sections of the rod toward and from each other to better adapt the device to wind shields of different widths.

As shown in Fig. 8 the rod includes two sections 22$^a$ and 22$^b$, one of which has a socket 27 into which a projection 28 of the other extends. There may also be provided a sleeve 29 encircling the two rod sections at this point. As the sleeve alone will hold the two rod sections in alignment and permit of their relative rotation, it is apparent that the socket 27 and the projection 28 need not necessarily be employed, but proper spaces left between the opposed ends of the rod sections to permit of their adjustment toward and from each other within the sleeve.

The rod 22 or the separate sections thereof, is provided preferably at both ends with operating means extending rearwardly past the wind shield, and to a point within easy reach of the driver or other occupant. For an open car this operating means includes a lever or arm 30 which is rigidly secured to the rod. The lever terminates in a handle 31 which may be grasped by the occupant of the car and raised or lowered to oscillate the rod 22 and raise or lower the front edge of the panel. Any suitable means may be provided for effecting this rigid connection between the rod and the arm, as for instance a locking set screw 32, as shown in Fig. 4.

If the car be a closed one the lever arm is preferably of such form that it necessitates the smallest possible aperture through the frame at the end of the wind shield.

In Fig. 10 I have shown a construction particularly adapted for use with a closed car, and in which the operating arm has a section 33 extending radially from the rod 22 and a section 34 curved to lie in the arc of a circle having the rod 22 as an axis. This portion of the operating arm may thus move endwise through a comparatively small aperture 35 and the pulling or pushing of the handle 31 on the end of this operating arm will serve to tilt the panel to the desired angle.

Means are provided for supporting the panel carrying rod 22 and for holding it friction tight in any desired position. Such supporting and friction clamping means is illustrated in Figs. 2, 3, 4 and 7 as including a supporting collar or journal 36 held against rotation by a suitable bracket, and constituting a journal within which the rod 22 may rotate. To provide the friction clamping means the rod 22 has a collar 37 rigidly secured thereto and between this collar and the journal 36 is a friction washer 38. Between the collar of the operating handle 30 and the journal 36 is a split ring spring 39. By tightening a nut 40 on the end of the rod 22 the spring 39 may be pressed to give the desired tension and the screw 32 may thereafter be tightened to hold the arm 30 against rotation in respect to the rod.

Brackets are provided for supporting the bearing collars 36 and preferably these are so constructed that they may be attached to parallel converging or diverging windshield stanchions with the two bearing collars having their axes in alignment. The form of supporting bracket shown in Figs. 1, 2, 3 and 7 includes a bracket arm 41 having a suitable clamp for attaching it to the windshield stanchions. The clamp is shown as including a base portion 42 on the bracket arm 41, and a clamping plate 43 connected thereto by clamping screws 44. The bracket arm 41 is connected to the bearing collar 36 by means of a circular yoke 45 and trunnion screws 46 extending substantially horizontally. This permits the lower or base end of the bracket arm 41 to be swung about these horizontal pivotal connections so as to adapt it to windshield stanchions which are other than parallel. An alternative form of connection between the bearing collar and the bracket arm is shown in Fig. 12. Here the bearing collar 36$^a$ has depending lugs 47 pivotally secured to the upper end of the bracket arm 41$^a$ by means of a pivot bolt 46$^a$. This extends substantially at right angles to the plane of the wind shield to permit of the same character of movement as that above described. It will be obvious that the character of the clamping means at the lower end of the bracket arm 41 may be varied to better adapt it to different types of wind shield stanchions or other vehicle frame parts. Where the vehicle is a closed one the bracket arm may have its base portion 42$^a$ adapted to be secured to the vehicle frame by means of ordinary clamping bolts or screws.

The constructions above described are particularly adapted for use in vehicles having various conventional forms of wind shield supports. It will of course be evident that the vehicle frame might be specially constructed to facilitate attachment of my improved anti-glare device thereto.

In Fig. 11 I have shown a wind shield stanchion 15$^a$ with a lug or bracket 41$^a$ integral therewith and serving as a support for the pivot rod 22. In the constructions illustrated it will be noted that the two panels or screen sections are each provided with a handle member rigid therewith, whereby these panels may be independently adjusted. Thus each of the two occupants of the front seat of the vehicle may control the section directly in front of him so as to produce the desired results. Obviously the extent to which the edge of the panel is to be lowered to cut out the glare of the headlights of other vehicles will depend upon the elevation of the eyes of the occupant. The panel may be swung down so as to intercept the light rays from the headlight but not to such an extent as to obstruct the vision of the road immediately ahead.

It will be noted that the panels also project so as to leave the upper portion thereof dry and prevent vision from being obstructed by rain or snow. If the panel be of transparent material it may be lowered to such a point that the driver looks directly through it at such times as he wishes to cut out the glare of the sun or a headlight, but if the panel be of opaque material it will be lowered only to such point as will cut out the desired light rays but not interfere with the clear vision of the section of the road directly ahead of the vehicle.

It will of course be apparent that various changes may be made in the details of construction within the scope of my invention as defined in the appended claims.

Having thus described my invention, what I claim as new and desire to secure by Letters Patent is:—

1. A device of the class described, including an oscillatory rod, a panel carried thereby, a bracket having a bearing, a stop collar on said rod at one side of said bearing, a handle having a collar portion secured to said rod on the opposite side of said bearing, and means for adjusting said collars endwise of said rod to vary the frictional resistance to the rotation of the rod in the bearing.

2. A device of the class described, including a bracket having a bearing member, a rod mounted in said bearing, a pair of collars upon opposite sides of said bearing and adjustable toward each other to impart frictional resistance to the rotation of the rod, a panel rigidly secured to said rod at one side of said bearing, and a handle rigidly secured to said rod at the other side of the bearing, whereby upon swinging said handle the rotation of said rod and the swinging of said panel is resisted but not prevented.

3. A glare protecting device for wind shields, including a pair of clamps adapted to be secured to the wind shield stanchions, and each having an upwardly and forwardly extending arm presenting a bearing at its upper end, a rod disposed substantially parallel to the upper edge of the wind shield and in advance thereof, and supported for oscillation in said bearings, a translucent panel secured to said rod intermediate of its ends, means secured to said rod upon opposite sides of one of said bearings for frictional engagement with the bearing to resist oscillation of the rod, and a handle lever secured to one end of the rod beyond said bearing and extending rearwardly past the wind shield stanchion on the outer side thereof, whereby the rod may be oscillated and the panel moved to the desired position and held by said friction means.

4. A wind shield including an oscillatory rod, a panel rigidly secured thereto, a bearing member for said rod, a collar rigidly secured to said rod upon one side of said bearing member, a handle for oscillating said rod and having a collar slidable on said rod at the opposite side of said bearing member from said first mentioned collar, a friction washer between said bearing member and one of said collars, and means for adjusting the second mentioned collar endwise to vary the frictional resistance to the rotation of the rod.

Signed at New York in the county of New York and State of New York this 7th day of February, A. D. 1923.

GEO. A. ARNOLD.